United States Patent [19]

Shimizu et al.

[11] Patent Number: 4,873,610

[45] Date of Patent: Oct. 10, 1989

[54] DIELECTRIC ARTICLES AND CONDENSERS USING THE SAME

[75] Inventors: Akira Shimizu, Sagamihara; Norio Kaneko, Atsugi, both of Japan

[73] Assignee: Canon Kabushiki Kaisha, Tokyo, Japan

[21] Appl. No.: 303,999

[22] Filed: Jan. 31, 1989

Related U.S. Application Data

[63] Continuation of Ser. No. 27,398, Mar. 18, 1987, abandoned.

[30] Foreign Application Priority Data

Mar. 20, 1986 [JP] Japan .................................. 61-63788

[51] Int. Cl.⁴ ........................ H01G 3/075; H01G 4/10
[52] U.S. Cl. ..................................... 361/313; 361/321
[58] Field of Search .............................. 361/328–330, 361/311–313, 320, 321; 501/134–138; 29/25.42; 264/61; 252/62.3 BT

[56] References Cited

U.S. PATENT DOCUMENTS

| | | | |
|---|---|---|---|
| 2,563,307 | 8/1951 | Burnham et al. | 361/321 X |
| 3,210,607 | 10/1965 | Flanagan | 361/312 X |
| 3,305,394 | 2/1967 | Kaiser et al. | 361/313 X |
| 3,637,532 | 1/1972 | Ramisch et al. | 501/137 X |
| 3,728,694 | 4/1973 | Rohrer | 361/321 |
| 3,819,990 | 6/1974 | Hayashi et al. | 361/313 |
| 3,914,666 | 10/1975 | Schmickl et al. | 361/320 X |
| 4,437,139 | 3/1984 | Howard | 361/313 |
| 4,525,768 | 6/1985 | Wheeler | 361/321 |
| 4,654,750 | 3/1987 | Kumagai | 361/321 |
| 4,697,222 | 9/1987 | Kaneko et al. | 351/321 |

FOREIGN PATENT DOCUMENTS

| | | | |
|---|---|---|---|
| 2431175 | 3/1980 | France | 361/313 |
| 60-119009 | 6/1985 | Japan . | |

Primary Examiner—Donald A. Griffin
Attorney, Agent, or Firm—Fitzpatrick, Cella, Harper & Scinto

[57] ABSTRACT

A dielectric article comprises a laminate of plural thin dielectric material layers wherein at least one kind of combination of dielectric material layers different in temperature characteristics of permittivity is present and thickness of each layer is 1000 Å or less but not less than of monatomic layer.

16 Claims, 3 Drawing Sheets

DIELECTRIC ARTICLES AND CONDENSERS USING THE SAME

This application is a continuation of patent application Ser. No. 027,398 filed Mar. 18, 1987, and now abandoned.

BACKGROUND OF THE INVENTION

1. Field of the Invention

This invention relates to a dielectric article suitable to be used in dielectric parts of condensers (capacitors), semiconductor devices, light emitting devices, etc.

2. Related Background Art

Materials used for forming dielectric parts of condensers, semiconductor devices, light emitting devices, etc. are required to have a high permittivity. As these dielectric materials, ceramics have been mainly used.

Ceramics have a multi-component type structure formed from a plurality of inorganic materials through a calcination step and have the maximum point of permittivity ($\epsilon$) in the vicinity of the phase transition temperature Tc as shown in FIG. 6 and they function as dielectric when used in such a state that they can exhibit a high permittivity at the phase transition temperature Tc or in the vicinity thereof.

Ceramics as dielectric materials generally contain additives called shifter or depressor in order that they can have sufficiently high permittivity in the range of temperatures at which the articles in which they are incorporated are used, for example, room temperature or in order to extend the temperature range where high permittivity is obtained, namely, to extend the temperature range where they can be used as dielectrics. The shifter is added to shift the phase transition temperature Tc and the depressor is added to change the pattern of temperature characteristics of permittivity at phase transition temperature Tc or in the vicinity thereof.

Conventional dielectric articles comprising ceramics have the following problems:

(a) There are limitations in the scope in which phase transition temperature Tc can be shifted and in the scope of maximum value of permittivity which can be controlled.

(b) Addition of shifter or depressor causes reduction of permittivity or makes preparation or calcination procedure of raw materials complicated.

(c) The ceramics have multi-component structure and hence are difficult to form as a single crystal film or oriented film.

(d) Dielectric loss is apt to increase or defects such as pin holes are apt to occur and characteristics of the article per se cannot sufficiently be utilized.

Thus, the conventional dielectric articles have not necessarily sufficiently met the requirements demanded as dielectric articles while they are now applied for a wide variety of uses.

SUMMARY OF THE INVENTION

This invention has been made in an attempt to solve the above problems and the object of this invention is, therefore, to provide dielectric articles which are free from these problems and which sufficiently meet the requirements for efficiency demanded as dielectric articles.

The above object can be accomplished by this invention described hereinbelow.

That is, this invention relates to a dielectric article which comprises a plurality of thin dielectric material layers laminated so that at least one combination of dielectric material layers different in temperature characteristic of permittivity is present and that thickness of each layer is 1000 Å or less but not less than of monatomic layer.

That is, this invention is characterized by the constitution of laminate which comprises at least two dielectric material layers different in temperature characteristics of permittivity, each of said layers having a thickness of 1000 Å or less but not less than of monatomic layer. By such constitution, not only sufficiently high permittivity can be obtained, but also by merely changing the thickness of each layer within the range of 1000 Å or less but not less than of monatomic layer, the temperature range where a high permittivity can be obtained can easily be set within the desired temperature range without employing shifter or depressor as in the conventional ceramic materials and furthermore, temperature dependency of permittivity can be relaxed by extending the temperature range where a high permittivity is obtained and besides, the maximum value of permittivity can be controlled in a wide range.

DESCRIPTION OF THE PREFERRED EMBODIMENT

Referring to the accompanying drawings, this invention will be explained in detail below.

Figure 1:
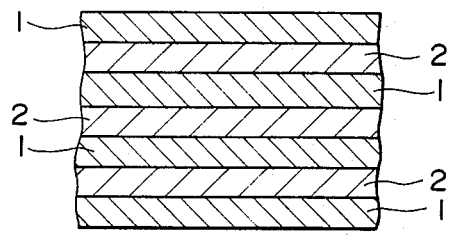
FIG. 1 and FIG. 5 are schematic partial cross-sectional views, which show constitution of the dielectric articles of this invention.

FIG. 1 is a partial cross-sectional view of one example of the dielectric article of this invention.

This dielectric article has a multi-layer structure comprising alternately laminated dielectric material layers 1 and 2 which are different in temperature characteristics of permittivity, namely, it has one kind of combination of dielectric material layers different in temperature characteristics of permittivity.

Figure 2:
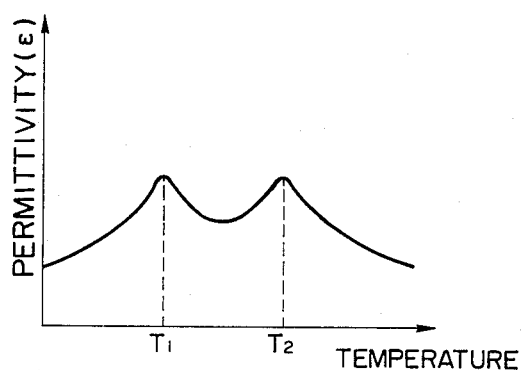
FIG. 2 is a graph which shows the temperature characteristic curve of permittivity obtained when the thickness of each layer in constitution of FIG. 1 is more than 1000 Å.

Thickness of dielectric material layers 1 and 2 may vary depending on the desired uses of the dielectric article, but preferably is 1000 Å or less, respectively. When the thickness of dielectric material layers 1 and 2 is more than 1000 Å, apparent permittivity of the dielectric article shows a permittivity similar to that of a series condenser wherein dielectric material layer 1 and dielectric material layer 2 are merely connected in series as shown in FIG. 2. As a result, maximum point ($T_1$, $T_2$) are specified depending on the dielectric materials of layers 1 and 2 (for example, when dielectric material layer 1 is made of $BaTiO_3$ and dielectric layer 2 is of $PbTiO_3$, $T_1 = 130°$ C., $T_2 = 490°$ C.) to limit the temperature range for application of dielectric article and when the maximum points are positioned within the desired temperature range, scope of selection of dielectric materials constituting layers 1 and 2 becomes very narrow and furthermore, sufficiently high permittivity cannot be obtained in the desired temperature range.

Figure 4:
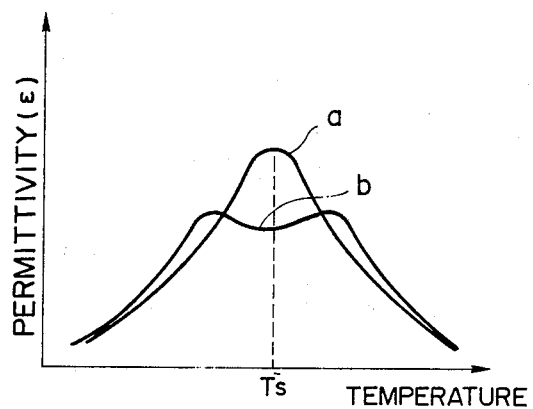
FIG. 4 is a graph which shows the temperature characteristic curve of permittivity of the dielectric article of this invention having the constitution as shown in FIG. 1.

On the other hand, when thickness of dielectric layers 1 and 2 is 1000 Å or less, but not less than of monatomic layer, the dielectric article exhibits such temperature characteristics as having maximum point of sufficiently high permittivity at temperature Ts or in the vicinity thereof as shown in FIG. 4. Besides, only by variously changing the thickness of each layer within the range of 1000 Å or less, Ts can be easily set in the desired temperature range; it becomes possible to smoothen the curve including the maximum point set within a specific temperature range which includes Ts, thereby to reduce the change of permittivity in that temperature range; temperature range where high permittivity are obtained can be extended; or the maximum value of permittivity can be controlled in wider scope.

Figure 3:
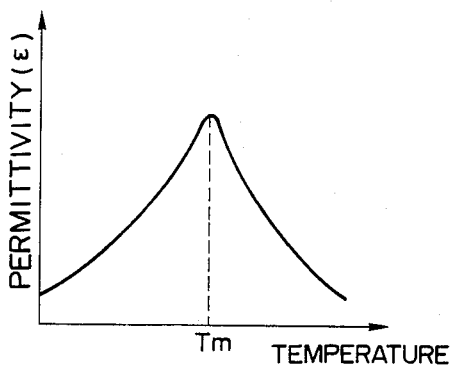
FIG. 3 is a graph which shows temperature characteristic curve of permittivity of dielectric article of single layer structure comprising mixed crystal of the materials of dielectric layers 1 and 2 of the dielectric article of FIG. 1.

For example, when each of thickness $L_1$ of dielectric layer 1 and thickness $L_2$ of dielectric layer 2 and ratio of them are changed within the range of 1000 Å or less but not less than of monatomic layer, there can be obtained a temperature characteristic which is intermediate between the temperature characteristic of permittivity as shown in FIG. 2 and that of a dielectric article of single-layer structure comprising a mixed crystal of dielectric materials of layers 1 and 2 as shown in FIG. 3. That is, when $L_1$ and $L_2$ are respectively reduced, the dielectric article exhibits a temperature characteristic of permittivity close to the one as shown in FIG. 3 (curve a in FIG. 4), namely, the higher permittivity can be obtained. When these values $L_1$ and $L_2$ are increased, the temperature characteristic curve of permittivity becomes close to the one as shown in FIG. 2 (curve b in FIG. 4), namely, it has two maximum points between which change of permittivity is small. In FIG. 3, Tm is determined by the mixing ratio of the two different materials and is positioned between $T_1$ and $T_2$ in FIG. 2. Therefore, when a dielectric article is made with such structure, also, the maximum point is fixed depending on the kind of the mixed materials and the mixing ratio, resulting in limitation of temperature range for application of the dielectric article and when the maximum point is positioned in the desired temperature range, scope of selection of materials becomes very narrow. When $L_1/L_2$ is increased, Ts in FIG. 4 closes to $T_1$ in FIG. 2 and when the ratio is decreased, it conversely closes to $T_2$. Therefore, the state of high permittivity can be easily adapted to the actual temperature range in which the dielectric article is used by adjusting $L_1/L_2$. For example, as shown in Examples mentioned later, Ts can be set at room temperature by employing $L_1/L_2$ of above 0.5.

As explained above, this invention has been accomplished by finding the relation between combination of dielectric materials composing each layer of a multi-layer dielectric article with thickness of each layer and temperature characteristic of permittivity exhibited by the dielectric article.

Figure 5:
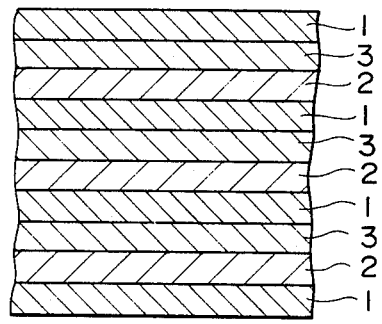
Figure 6:
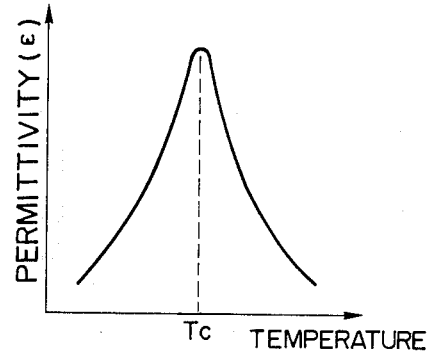
FIG. 6 is a graph which shows the temperature characteristic curve of permittivity of ceramics as a dielectric article.

The above explanation is on a dielectric article comprising two kinds of dielectric material layers 1 and 2 different in temperature characteristic of permittivity, but the dielectric article of this invention is not limited to this constitution and the dielectric article may be of such constitution as a laminate of regularly or irregularly arranged three or more dielectric material layers different in temperature characteristic of permittivity depending on the desired properties or functions of the dielectric articles. FIG. 5 illustrates an example of a dielectric article comprising three kinds of dielectric material layers 1, 2 and 3 which are different in temperature characteristic of permittivity and which are regularly arranged and laminated, namely, a dielectric article of multilayer structure having three kinds of combinations each of which consists of dielectric material layers different in temperature characteristic of permittivity. Thus, it is possible to obtain temperature characteristic curve of permittivity which is evener in the vicinity of the maximum point by using three or more kinds of dielectric material layers having different temperature characteristics of permittivity.

Furthermore, according to this invention, dielectric strength or capacity when used in condenser can be controlled by adjusting total number of dielectric layers. That is, dielectric strength can be increased by increase of total number of dielectric layers and capacity when used in condenser can be increased by decrease of total number of dielectric layers. Incidentally, total thickness of dielectric article when used in condenser is preferably 100 Å or more, more preferably 500 Å or more then the dielectric strength being made to suit the use as a condensor.

In the present invention, a dielectric article is produced by laminating two or more laminations (hereinafter referred to as unit cell) constituted of at least two kinds of dielectric materials having different temperature characteristics from each other kind (referenced below as A, B, C, D ...).

The dielectric article obtained in the present invention may of course be constituted as a multilayer structure of periodically laminated unit cells of one type (called as homo unit cell type), or depending on the purpose, as a structure of periodically and repeatedly laminated unit cells of plural types or of repeatedly laminated unit cells of different types at an appropriate interval for each unit cell (those are called as hetero unit cell type).

That is, as the dielectric article of the present invention, there are illustrated structure of ABABAB ... as a first embodiment, ABCABCABC ... as a second, ABCDABCDABCD ... as a third, ACACAC ... as a fourth, ABABABABCABCABC ... as a fifth, ABA-BABCABABABC ... as a sixth, etc., wherein AB, ABC, ABCD and AC are unit cells.

The dielectric material layers which constitute the dielectric article of this invention may be made of any of paraelectrics, ferroelectrics and antiferroelectrics. As examples of these materials, mention may be made of compounds such as $BaZrO_3$, $CaTiO_3$, $La_2O_3$, $TiO_2$, $BaTiO_3$, $PbTiO_3$, $SrTiO_3$, $Si_3N_4$, etc. or mixed crystals such as $(Pb_xLa_{(1-x)})(Zr_yTi_{(1-y)})O_3$, etc.

The dielectric articles of this invention can be obtained by forming consecutively each dielectric material layer on a substrate as a laminate in the predetermined order and at the predetermined thickness using at least two materials suitably selected from the above enumerated materials by a film forming method, e.g., RF sputtering method, flash deposition method, EB deposition method, ion-plating method, MOCVD method, MBE method, etc. in such a manner that at least one kind of combination of dielectric material layers different in temperature characteristic of permittivity is present in many layers and that thickness of each layer is 1000 Å or less with a predetermined total number of the dielectric material layers in the laminate.

The dielectric articles of this invention made by such method are less in defects such as pinholes in the dielectric material layers and in electric loss and better in quality as dielectric articles as compared with the articles made of the conventional ceramics. Furthermore, since dielectric layers can be formed at substrate temperature lower than calcination temperature employed in formation of the conventional ceramic materials, there are advantages in production that the step of formation is simplified and formation of layers can be easily controlled and in shapes that dielectric material layers can be formed as a single crystal film or an oriented film and films of other structure can be easily formed thereon.

This invention will be explained in more detail by the following examples.

EXAMPLE 1

A BaTiO$_3$ layer of about 40 Å thick was formed by RF sputtering method. In the same manner, a SrTiO$_3$ layer of about 20 Å thick was laminated on said BaTiO$_3$ layer. This procedure was repeated thrice and finally, a BaTiO$_3$ layer of about 40 Å thick was laminated as an uppermost layer to obtain the dielectric article of this invention having the construction as shown in FIG. 1.

Ratio of thickness, BaTiO$_3$ layer/SrTiO$_3$ layer was about 2.

Temperature characteristic of permittivity of thus obtained dielectric article was measured to obtain such that similar to a shown in FIG. 4. Ts of the dielectric article in this Example was about 10° C. and permittivity of 10000-20000 was obtained in the range of about 0-about 30° C. Therefore, the dielectric article obtained in this Example shows sufficiently high permittivity at room temperature.

EXAMPLE 2

A dielectric article was made in the same manner as in Example 1 except that thickness of BaTiO$_3$ layer and that of SrTiO$_3$ layer were about 160 Å and about 80 Å, respectively. The temperature characteristic of permittivity of thus obtained dielectric article was similar to that of b in FIG. 4. Ts of the dielectric article of this Example was above 10° C. and there was obtained a permittivity of 7000-10000 in the range of about $-30°$ C.-about 50° C. with small fluctuation of permittivity in this temperature range. Thus, the dielectric article obtained in this Example can provide stable functions in the above temperature range including room temperature.

COMPARATIVE EXAMPLE 1

A dielectric article was produced in the same manner as in Example 1 except that thickness of BaTiO$_3$ layer and that of SrTio$_3$ layer were 3000 Å, respectively. The temperature characteristic of permittivity of thus obtained dielectric article was similar to that shown in FIG. 2. T$_1$ and T$_2$ of this dielectric article were about 0° K. and about 400° K., respectively. The permittivity at room temperature was about 700.

Figure 7:
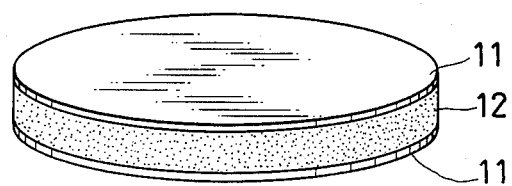
FIG. 7 illustrates schematically a condenser comprising the subject dielectric article.

Further, as in the forgoing examples, dielectric articles are produced by the use of the materials for lamination given in Table 1 to obtain results shown in Table 2. In addition, onto both the flat surfaces of a disc-shaped material 12 comprising as at least one part thereof a dielectric article as obtained in the foregoing examples (e.g. a dielectric article having a lamination structure of BaTiO$_3$ layers and SrTiO$_3$ layers formed as in Example 1 but the procedure being repeated one hundred times), silver is deposited as electrodes 11 by vacuum vapor deposition to give a capacitor as shown in FIG. 7. Capacitors obtained as above had very good electrical characteristics.

As explained hereinabove, in the dielectric article of this invention which comprises a laminate of many dielectric material layers having respectively a thickness of 1000 Å or less and which contain at least one combination of dielectric material layers different in temperature characteristic of permittivity, not only a sufficiently high permittivity can be obtained, but also by merely changing thickness of each layer within the range of 1000 Å or less or changing combination of dielectric materials of the layers, temperature range where high permittivity is obtained can be easily set within the desired temperature range without using shifter or depressor used in the conventional ceramic materials, furthermore, it becomes easy to make gentle the temperature characteristic curve including the maximum point set in a specific temperature range to reduce change of permittivity in that temperature range, extend the temperature range where high permittivity can be obtained or control the maximum value of permittivity in wider scope.

Furthermore, as compared with the material made of conventional ceramics, occurrence of defects such as pinholes in dielectric material layers can be reduced and dielectric loss can be decreased. Besides, since it is possible to form dielectric material layers at a substrate temperature lower than calcination temperature for production of conventional ceramic materials, the step of formation of dielectric material layers is simplified and formation of layers can be easily controlled. In addition dielectric material layers can be formed as single crystal film or oriented film and films of other structure can be easily formed thereon.

Additionally, the dielectric article of this invention, due to small temperature dependent rate of change in dielectric constant at around normal temperature, exhibits stable performance with high reliability, involves no problem of lowering in mechanical strength due to phase transition at around normal temperature, and therefore can be utilized effectively as a functional element.

Thus, according to this invention, it has become possible to provide dielectric articles which sufficiently meet various characteristic requirements for dielectric articles.

TABLE 1

| | Material for lamination a (layer thickness Å) | Material for lamination b (layer thickness Å) | Material for lamination c (layer thickness Å) | Repetition number of lamination (times) |
|---|---|---|---|---|
| Example 3 | BaTiO$_3$ | PbTiO$_3$ | | 10 |

TABLE 1-continued

| | Material for lamination a (layer thickness Å) | Material for lamination b (layer thickness Å) | Material for lamination c (layer thickness Å) | Repetition number of lamination (times) |
|---|---|---|---|---|
| Example 4 | $PbTiO_3$ 20Å | $Bi_4Ti_3O_{12}$ 800Å | — | 5 |
| Example 5 | $BaTiO_3$ 40Å | $Pb(Mg_{0.5}W_{0.5})O_3$ 30Å | — | 20 |
| Example 6 | $PbTa_2O_6$ 20Å | $WO_3$ 50Å | — | 30 |
| Example 7 | $Cd_2Nb_2O_7$ 30Å | $WO_3$ 180Å | $BaTiO_3$ 1000Å | 100 |
| Example 8 | $PbTa_2O_6$ 20Å | $BaTiO_3$ 600Å | $Cd_2Nb_2O_7$ 20Å | 80 |
| Example 9 | $BaTiO_3$ 30Å | $PbTiO_3$ 950Å | $SrTiO_3$ 30Å | 3 |
| Comparative Example 2 | $BaTiO_3$ 160Å 1500Å | $PbTiO_3$ 20Å 2000Å | $SrTiO_3$ 3000Å | 3 |

TABLE 2

| | Ts, Ta, Tb, Tc | Permittivity (Temperature) |
|---|---|---|
| Example 3 | Ts = 100° C. | 1,500–2,500 (−30° C. 50° C.) |
| Example 4 | Ts = 460° C. | 7,000–8,500 (400° C.~500° C.) |
| Example 5 | Ts = 60° C. | 9,000–10,000 (0° C.~100° C.) |
| Example 6 | Ts = 65° C. | 2,000–4,000 (20° C.~70° C.) |
| Example 7 | Ts = 20° C. | 6,000–6,500 (−30° C.~50° C.) |
| Example 8 | Ts = 45° C. | 8,000–10,000 (0° C.~60° C.) |
| Example 9 | Ts = 15° C. | 15,000–20,000 (−30° C.~50° C.) |
| Comparative Example 2 | Ta = 130° C. Tb = 490° C. Tc = −163° C. | 100–700 (−30° C.~50° C.) |

We claim:

1. A dielectric article which comprises a plurality of laminated repeating unit cells, each unit cell comprising at least two thin dielectric material layers, one of said layers having temperature characteristic of permittivity different from the other and wherein the thickness of each layer is 1000Å or less but not less than of monatomic layer.

2. A dielectric article according to claim 1 wherein said unit cell comprises two kinds of dielectric material layers different in temperature characteristic of permittivity.

3. A dielectric article according to claim 1 which comprises three kinds of dielectric material layers different in temperature characteristic of permittivity.

4. A dielectric article according to claim 3 wherein the three kinds of dielectric material layers are regularly arranged and laminated.

5. A dielectric article according to claim 1 wherein the dielectric is selected from the group consisting of $BaZrO_3$, $CaTiO_3$, $La_2O_3$, $TiO_2$, $BaTiO_3$, $PbTiO_3$, $SrTiO_3$, $Si_3N_4$ and $(Pb_xLa_{(1-x)})(Zr_yTi_{(1-y)})O_3$.

6. A dielectric article according to claim 1 wherein the repetition number of said unit cell is 3–100.

7. A dielectric article according to claim 1 wherein the thickness of said dielectric article is 100Å or more.

8. A dielectric article according to claim 1 wherein the thickness of said dielectric article is 500 Å or more.

9. A condenser having a pair of electrodes and a dielectric article sandwiched between said electrodes which article comprises a plurality of laminated repeating unit cells, each unit cell comprising at least two thin dielectric material layers, one of said layers having temperature characteristic of permittivity different from the other and wherein the thickness of each layer is 1000 Å or less but not less than of monatomic layer.

10. A condenser according to claim 9 wherein said unit cell comprises two kinds of dielectric material layers different in temperature characteristic of permittivity.

11. A condenser according to claim 9 wherein said unit cell comprises three kinds of dielectric material layers different in temperature characteristics of permittivity.

12. A condenser according to claim 11 wherein the three kinds of dielectric material layers are regularly arranged and laminated.

13. A condenser according to claim 9 wherein the dielectric is selected from the group consisting of $BaZrO_3$, $CaTiO_3$, $La_2O_3$, $TiO_2$, $BaTiO_3$, $PbTiO_3$, $SrTiO_3$, $Si_3N_4$, and $(Pb_xLa_{(1-x)})(Zr_yTi_{(1-y)})O_3$.

14. A condenser according to claim 9 wherein the repetition number of said unit cell is 3–100.

15. A condenser according to claim 9 wherein the thickness of said dielectric article is 100 Å or more.

16. A condenser according to claim 9 wherein the thickness of said dielectric article is 500 Å or more.

* * * * *

UNITED STATES PATENT AND TRADEMARK OFFICE
CERTIFICATE OF CORRECTION

PATENT NO. : 4,873,610
DATED : October 10, 1989
INVENTOR(S) : AKIRA SHIMIZU, ET AL.

Page 1 of 2

It is certified that error appears in the above-identified patent and that said Letters Patent is hereby corrected as shown below:

COLUMN 4

Line 28, "increased" should read --decreased--.
Line 33, "condensor." should read --condenser.--.

COLUMN 5

Line 63, "3000 Å, respectively." should read
--1500 Å and 3000 Å, respectively.--.

COLUMN 6

Line 7, "are" should read --were--.
Line 32, "materials, furthermore," should read
--materials. Furthermore,--.

COLUMN 7

Line 50, "which" should read --wherein said unit cell--.

UNITED STATES PATENT AND TRADEMARK OFFICE
CERTIFICATE OF CORRECTION

PATENT NO. : 4,873,610

DATED : October 10, 1989

INVENTOR(S) : AKIRA SHIMIZU, ET AL.

It is certified that error appears in the above-identified patent and that said Letters Patent is hereby corrected as shown below:

COLUMN 8

Line 28, "electrodes" should read --electrodes,--.

Signed and Sealed this

Thirteenth Day of November, 1990

Attest:

HARRY F. MANBECK, JR.

*Attesting Officer*          *Commissioner of Patents and Trademarks*